Patented Oct. 12, 1926.

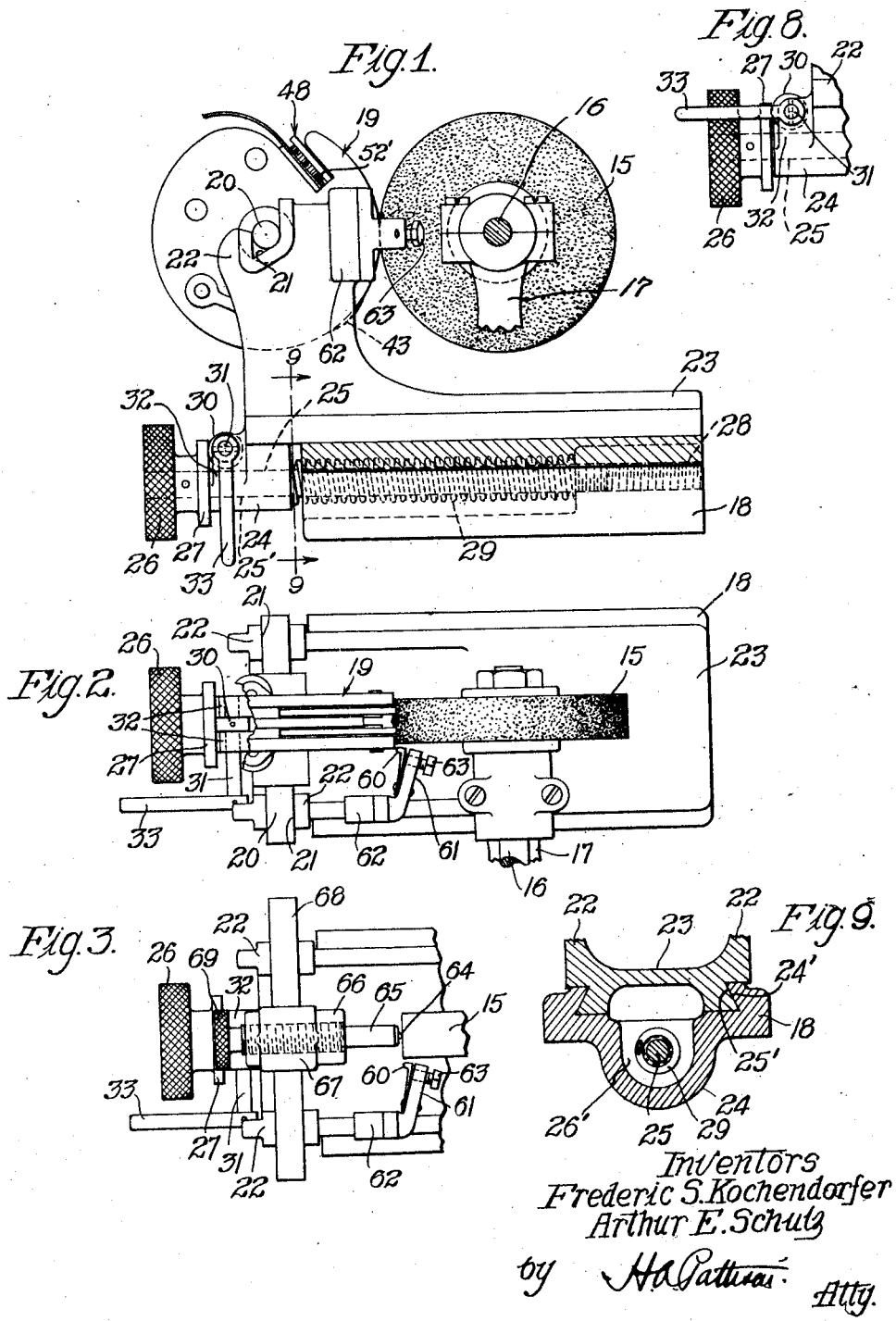

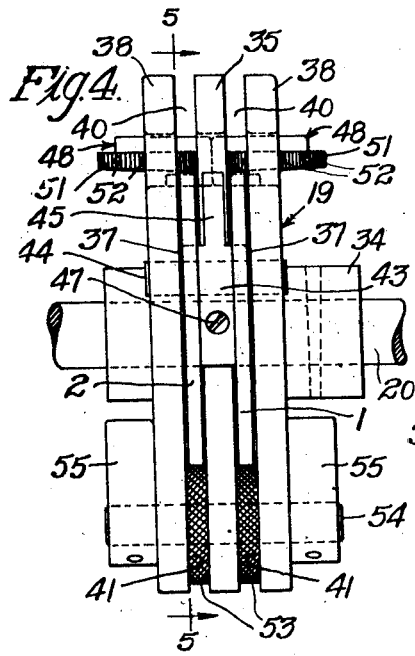
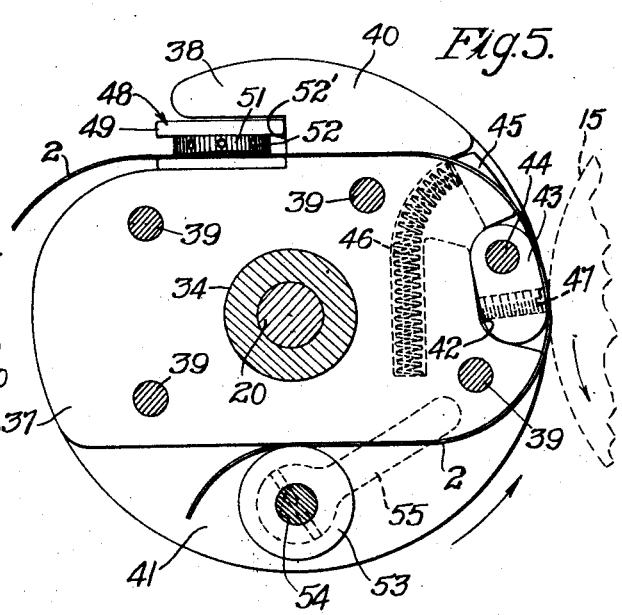
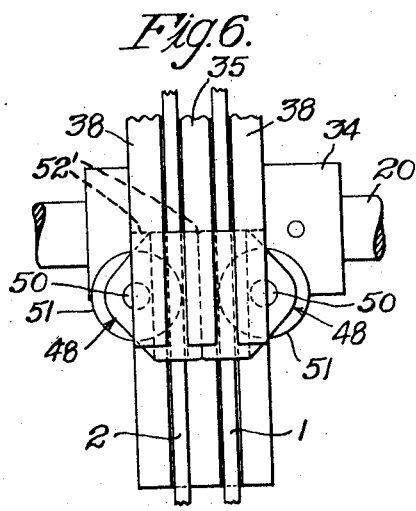
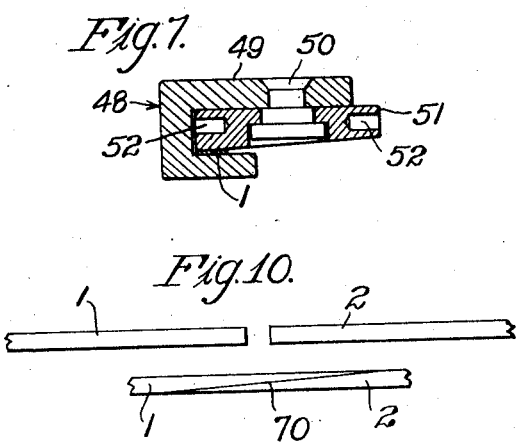

1,602,681

UNITED STATES PATENT OFFICE.

FREDERIC SHIELDS KOCHENDORFER, OF RIVER FOREST, AND ARTHUR EHRHOLD SCHULZ, OF CHICAGO, ILLINOIS, ASSIGNORS TO WESTERN ELECTRIC COMPANY, INCORPORATED, OF NEW YORK, N. Y., A CORPORATION OF NEW YORK.

GRINDING APPARATUS.

Application filed August 31, 1922. Serial No. 585,373.

This invention relates to improvements in grinding apparatus designed to grind a metallic part a fixed and predetermined amount. The apparatus herein disclosed is particularly designed for grinding metallic tapes, but it is to be understood that the apparatus may be modified to grind articles other than tapes, without departing from the spirit and scope of the present invention. An object of the invention is to provide an apparatus for grinding through a metallic tape to sever it, producing a ground surface which is diagonal with the plane of the tape.

A further object of the invention is to produce a grinding apparatus which is designed to grind through two metallic tapes simultaneously, producing identical ground surfaces which are diagonal with the plane of the tapes, so that when the ground surfaces are placed one upon the other the faces of the tapes will be in the same planes.

An apparatus made in accordance with the present invention may be used to advantage with the metallic taping machine disclosed in Patent 1,565,652, issued December 15, 1925. When used with this machine the grinding apparatus is employed to prepare a joint between two tapes, the two ground surfaces being secured together by electric welding or other suitable means. The grinding apparatus is particularly designed to co-operate with the welding and annealing apparatus disclosed in a co-pending application, Serial No. 585,559, filed August 31, 1922, the two tapes being held by suitable clamps in the grinding apparatus, the clamps and ground tapes being removable from the grinding apparatus and the clamps disposable against suitable stop devices provided on the welding and annealing apparatus so that the ground surfaces are placed one upon the other and in position to be welded by the electrodes of the welding apparatus.

Although the grinding apparatus herein disclosed is particularly adapted for use with the mechanisms above described, it is to be understood that it is not limited to such uses and that the invention is to be limited only by the spirit and scope of the appended claims.

Various other objects and advantages of the invention will more fully appear from the following description and are particularly pointed out in the appended claims.

In the accompanying drawings which illustrate one embodiment of the invention—

Fig. 1 is a side elevation partly in section of a grinding apparatus made in accordance with the invention;

Fig. 2 is a top plan view of the apparatus shown in Fig. 1;

Fig. 3 is a fragmentary top plan view illustrating a grinding wheel dresser employed with the apparatus;

Fig. 4 is an enlarged end elevation of the work support;

Fig. 5 is a vertical sectional view taken on the line 5—5 of Fig. 4;

Fig. 6 is a fragmentary top plan view of the work support shown in Fig. 4;

Fig. 7 is an enlarged vertical sectional view showing in detail one of the tape clamps;

Fig. 8 is a fragmentary side elevation showing, in its operated position, the adjusting means for causing a fixed predetermined movement between the work support and grinding element;

Fig. 9 is a vertical sectional view taken on the line 9—9 of Fig. 1;

Fig. 10 is a diagrammatic view illustrating metal tapes before and after the grinding operation.

Referring now to the drawings in detail in which like reference numerals designate similar parts throughout the several views, 15 indicates a grinding wheel which is fast upon a shaft 16 revolvably mounted within suitable bearings carried by a bracket 17 which is attached by means (not shown) to a base 18. The shaft 16 may be driven by any suitable means (not shown) to actuate the grinding wheel 15.

Mounted adjacent the grinding wheel 15 is an annular rotatable work supporting member 19 which will be described in detail hereinafter. The member 19 is fast upon a central shaft 20, which projects at each side of the work support, the projecting ends being journalled in alined slots 21 formed in parallel spaced brackets 22 which are integral with a plate 23. Due to the character of the support for the shaft 20, the work supporting element and shaft may be readily placed in or removed from their bearings in the brackets 22, the purpose of which construction will be hereinafter described. The plate 23 has its lower surface cut to form a dovetail slide 24′ which fits within an undercut slot 25′ cut in the base 18, as is shown in Fig. 9.

Integral with the plate 23 is a tubular boss 24 mounted within which is a rod 25 which projects beyond the boss 24 and through a slot 26′ cut in the base 18, as shown in Fig. 9. Pinned to one end of the rod 25 is a knurled knob 26 provided with a flange 27 which rests against the adjacent face of the boss 24. The rod 25 beyond the boss 24 is screw-threaded and meshes with a threaded opening 28 made in the base 18 (Fig. 1). A compression spring 29 surrounding the rod 25 and bearing at one end against the boss 24 and at its other end against the end of the slot 26′ serves to hold the opposite face of the boss 24 against the flange 27 of the knob 26.

To move the work support 19 toward the grinding wheel 15, the knob 26 is turned clockwise, rotating the shaft 25, and since this shaft is threaded, the knob 26 is moved toward the right, as viewed in Fig. 1, carrying the boss 24, plate 23, and work support with it. To move the work support away from the grinding wheel, the knob 26 is turned in the opposite direction, feeding the shaft 25 to the left, as viewed in Fig. 1, the boss 24, plate 23, and work support being moved in the same direction by the energy stored in the compressed spring 29.

Means is provided for moving the work supporting element a fixed and predetermined distance toward or away from the grinding wheel, said means comprising an eccentric cam 30 mounted upon a pin 31 rotatably mounted in alined openings formed in parallel ears 32 integral with the boss 24. Attached to one end of the shaft 31 is an operating handle 33 by means of which the shaft and cam may be rotated. When the lever 33 is in a vertical position, as shown in Fig. 1, the flange 27 of the knob 26 is in engagement with the adjacent face of the boss 24. As the arm 33 is moved upwardly, the eccentric portion of the cam 30 engages the flange 27 of the knob 26 and serves to force the boss 24, plate 23 and the work supporting element towards the right, as viewed in Fig. 1. With the lever 33 in a horizontal position, as shown in Fig. 8, the cam 30 has moved the boss toward the right, its maximum distance, leaving a space between the flange 27 and adjacent face of the boss 24. To move the work support away from the grinding wheel, the lever 33 is restored to a vertical position, the spring 29 serving to move the boss 24, plate 23 and work supporting element toward the left, as viewed in Fig. 1. The extent of the fixed movement of the work support may be adjusted by substituting larger or smaller cams for the cam shown, or an adjustable and expansible cam may be substituted, as will be readily understood. The purpose of this adjusting means will be hereinafter explained.

The work supporting member 19 shown is designed to support a pair of metallic tapes of the type used in the taping machine disclosed in Patent 1,562,652, issued December 15, 1925, but it is to be understood that the member 19 may be constructed to support parts other than tapes, without departing from the spirit and scope of the present invention.

The member 19 comprises a hub 34, pinned to the shaft 20. Integral with the hub 34 is a disk 35 and on each side thereof is a spacer plate 37 and an end plate 38, all of which are secured to the disk 35 by pins 39. The spacer plates 37 are made flat on two opposite sides to form slots 40 and 41 between the disk 35 and end plates 38, as shown in Figs. 4 and 5. The disk 35 and spacer plates 37 are provided with registering cutout portions to form a recess 42 in their peripheries to receive a hardened steel anvil 43 which is pivotally mounted upon a stud 44 fastened at each end in the end plates 38. The anvil has a width equal to the combined thickness of the disk 35 and spacer plates 37. Integral with the anvil 43 is an arm 45 which is pressed outwardly by a compression spring 46 fitting within a slot cut in the disk 35. The spring 46 serves to normally hold the rear face of the anvil against the adjacent face of the recess 42. In order to position the outer peripheral face of the anvil 43 slightly beyond the periphery of the end plates 38, a screw 47 is provided which, when screwed inwardly, engages the face of the recess 42 and forces the anvil outwardly by rotating it counter-clockwise against the spring 46. The purpose of this adjusting means will be hereinafter described.

A clamp 48 is attached to each of the tapes to be ground, at a point a few inches from the end of the tapes. Each clamp comprises a frame 49 U-shaped in cross-section, as shown in Fig. 7. Pivoted in the frame on a pin 50 is an annular disk 51 having a diagonal surface. By turning the disk 51 with a suitable stylus, which may be inserted in spaced recesses 52 formed in the periphery of the disk, the tape 1 may be clamped between the frame and the diagonal surface of the disk, as shown in Fig. 7. To release the tape, the disk is turned to bring a narrower portion thereof adjacent the tape, after which the tape may be withdrawn, as is readily understood.

The tapes 1 and 2 with the clamps 48 attached are placed in the work support 19, the clamps being positioned back to back in registering slots 52' cut in the disk 35 and end plates 38, as shown in Figs. 5 and 6. With the clamps in this position the tapes register with the slots 40 between the disk 35 and end plates 38 and they are drawn down against the spacer plates 37, around the anvil 43 and are clamped against the lower surface of the spacer plates 37 by knurled eccentric disks 53 mounted to rotate with shafts 54 supported by the disk 35 and end plates 38. The said shafts are on the outside of the end plates 38 and have pinned thereto handles 55 by which they may be turned to clamp the tapes between the disks and spacer plates.

In using the grinding apparatus, before the tapes are applied to the work support 19, as above described, the screw 47 within the anvil 43 is turned so as to permit the anvil to be rocked out by the spring 46 until it projects beyond the periphery of the center disk 35 and end plates 38 a distance such that its point of greatest protrusion is approximately equal to the thickness of the tape to be ground. The work support is then positioned in the bearings 21 carried by the parallel brackets 22 and is slid sidewise, so that the anvil is opposite a gauge 60 (Fig. 2). The gauge 60 is in the form of a spring fastened to an oblique arm 61 carried by a bracket 62 integral with one of the parallel brackets 22. By means of a screw 63 which bears against the under-surface of the gauge spring 60, the spring may be adjusted until it just touches the point of greatest protrusion of the anvil 43.

The work support is then removed from its bearings in the bracket 22 and the grinding wheel dressed so as to present a smooth and even grinding surface. The means for dressing the grinding wheel, referring to Fig. 3, comprises a diamond grinding point 64 carried by the outer end of a screw-threaded rod 65 which is threaded within a boss 66 integral with a hub 67 fast upon a transverse bar 68 which projects at each side of the boss and hub. When the wheel is to be dressed, the bar 68 is placed in the bearings 21 carried by the parallel brackets 22, as shown in Fig. 3, and is then slid sidewise until the diamond point 64 is opposite the gauge spring 60. By means of a knurled knob 69 fast upon the outer end of the rod 65, the said rod is adjusted in or out until the diamond point 64 just touches the gauge spring 60. The dresser is then slid back until it is opposite the grinding wheel 15. By means of the knob 26 the parallel brackets are moved toward the grinding wheel carrying the dresser and gauge spring 60 as a unit, until the diamond point 64 engages the grinding wheel, after which the diamond point is moved back and forth across the surface of the grinding wheel to dress it. The knob 26 is turned to feed the dresser forward any desirable distance until the grinding wheel has been dressed so as to present a true and even grinding surface.

After the grinding wheel has been dressed the dresser is removed. The tapes to be ground are placed in the work support 19, in the manner previously described, and the work support then deposited in the bearings 21 carried by the brackets 22 in the position illustrated in Fig. 1, in which the anvil 43 is positioned below the grinding wheel 15. The lever 33 is slightly raised to rotate the cam 30 and thereby feed the work support a minute distance toward the grinding wheel. The work support is then rotated counter-clockwise, as viewed in Fig. 1, to engage the tapes on the anvil with the grinding wheel which grinds a small amount off of the surface thereof. The work support is then rotated clockwise into its position shown in Fig. 1 and the lever 33 then moved an additional distance upward to feed the work support a further distance toward the grinding wheel. The work support is then rotated counter-clockwise to engage the tapes on the anvil with the grinding wheel to grind off an additional amount of surface thereof. This operation is continued until the lever 33 has been moved to a horizontal position, as shown in Fig. 8, in which it has fed the work support a distance toward the grinding wheel sufficient to grind through the tapes on the anvil of the work support. The tapes are ground through on a diagonal line, as is clearly shown diagrammatically in Fig. 10.

The tapes with the clamps 48 attached are then removed from the work support, the ground surfaces being placed one upon the other, as shown at 70 in Fig. 10. Due to the diagonally ground surfaces the faces of the tapes are positioned in the same planes.

The tapes may be secured together in any suitable manner as for instance by the welding and annealing apparatus described in co-pending application, Serial No. 585,559, filed August 31, 1922. When this apparatus is used, the tapes are removed from the work support and placed on a suitable jig, the clamps engaging stops which will determine the proper overlapping of the surfaces of the tapes. The tapes are then welded together by a series of spot welds, the welded joint being annealed to give it a tensile strength and ductility equal to that of the rest of the tapes.

What is claimed is:—

1. In a grinding apparatus, a grinding wheel, a work supporting element rotatably supported adjacent said grinding wheel, the axes of the grinding wheel and work supporting element being mounted in the same horizontal plane, said work supporting element having means for clamping a metallic tape at spaced points, adjustable means for causing relative movement between the grinding wheel and the work supporting element, and means for causing a predetermined fixed relative movement between the grinding wheel and work supporting element to bring the portion of the tape between its points of engagement by the clamping means into contact with the grinding wheel.

2. In a grinding apparatus, a grinding wheel, a work supporting element rotatably mounted adjacent said grinding wheel, an anvil carried by said work supporting element, and means for holding the work against said anvil.

3. In a grinding apparatus, a grinding wheel, a work supporting element rotatably mounted adjacent said grinding wheel, the axes of the grinding wheel and work supporting element being mounted in the same horizontal plane, an anvil carried by said work supporting element and projecting beyond the work supporting element, and means for holding the work against said anvil.

4. In a grinding apparatus, a grinding element, a work supporting element having an adjustable anvil, means carried by said work supporting element for holding a metallic tape against said anvil, and means for causing relative movement between the grinding wheel and work supporting element to grind the portion of the tape on the anvil.

5. In a grinding apparatus, a grinding wheel, a rotatable work supporting element rotatably mounted adjacent said grinding wheel, the axes of the grinding wheel and work supporting element being mounted in the same horizontal plane, an adjustable anvil carried by said work supporting element, means carried by said work supporting element for holding the work against said anvil, and means for causing relative movement between the grinding wheel and work supporting element to grind the portion of the work on the anvil.

6. In a grinding apparatus, a grinding wheel, a work supporting element, an anvil carried thereby and projecting beyond the work supporting element, means for holding the work against the anvil, means for moving the work supporting element close to the grinding wheel, said work supporting element being rotatably supported whereby a rotation thereof will engage the work on the anvil with the grinding wheel.

7. In a grinding apparatus, a grinding wheel, a work supporting element, an adjustable anvil carried thereby and projecting beyond said element, means for holding a metallic tape against said anvil, said work supporting element being rotatably supported against the grinding wheel whereby a rotation of the work supporting element will engage the tape with the anvil on the grinding wheel.

8. In a grinding apparatus, a grinding wheel, a work supporting element, an anvil carried thereby and projecting beyond said element, means for holding the work against the anvil, means for feeding the work support a predetermined, fixed distance toward the grinding wheel, said work supporting element being rotatably supported whereby a rotation thereof will engage the work on the anvil with the grinding wheel.

9. In a grinding apparatus, a grinding element, a work supporting element, an anvil carried thereby and projecting beyond said element, means for holding the work against the anvil, means for causing relative movement between the work supporting element and grinding element, means for causing a fixed, predetermined, relative movement between the grinding element and work supporting element, said work supporting element being rotatably supported whereby a rotation thereof will engage the work on the anvil with the grinding element.

10. In a grinding apparatus, a grinding element, a rotatable work supporting element, clamping means carried by said supporting element for engaging the work at spaced points, means tending normally to displace the work, and means for adjusting said elements one relative to the other for rendering said second recited means effective for causing said work to firmly engage the grinding element upon the rotation of the work supporting element.

11. In a grinding apparatus, a grinding element, a rotatable work supporting element, clamping means carried by said supporting element for engaging the work at spaced points, adjustable means preliminarily set for limiting the movement of said supporting element with respect to said grinding element, and means for shifting said supporting element as the thickness of the work is reduced by its being engaged by the grinding element due to a rotary movement of said supporting element.

12. In a grinding apparatus, a grinding element, a rotatable work supporting element, a plurality of clamping members for securing a pair of metallic tapes at spaced points to said supporting element, a spring pressed member engaging said tapes for subjecting them to tension, means for progressively advancing the supporting element towards said grinding element as the thickness of the tapes is reduced by their being engaged by the grinding element due to a rotary movement of the supporting element, and means for limiting the extent of movement of said supporting element with respect to said grinding element, whereby the removal of material from the tapes is predetermined.

In witness whereof, we hereunto subscribe our names this 26th day of August A. D., 1922.

FREDERIC SHIELDS KOCHENDORFER.
ARTHUR EHRHOLD SCHULZ.